United States Patent [19]

Tripp et al.

[11] Patent Number: 5,376,172
[45] Date of Patent: Dec. 27, 1994

[54] METAL OXIDE PROCESSES AND TONERS THEREOF

[75] Inventors: Carl P. Tripp, Burlington; Michael L. Hair, Oakville; Richard P. N. Veregin, Mississauga, all of Canada

[73] Assignee: Xerox Corporation, Stamford, Conn.

[21] Appl. No.: 996,390

[22] Filed: Dec. 23, 1992

[51] Int. Cl.$^5$ .............................................. C04B 14/06
[52] U.S. Cl. .................................. 106/490; 427/219; 427/220; 427/217; 106/445; 106/448; 106/450; 106/457; 106/460; 106/471
[58] Field of Search ............... 106/490, 445, 448, 450, 106/457, 460, 471; 427/219, 220, 217

[56] References Cited

U.S. PATENT DOCUMENTS 3,635,743  1/1972  Smith ................................. 106/288

OTHER PUBLICATIONS

Leyden et al., *J. Am. Chem. Soc.*, 1987, 109, pp. 7141–7145, "Ammonia-Catalyzed Silylation Reactions of Cab-O-Sil with Methoxymethylsilanes" No month.

*Primary Examiner*—Mark L. Bell
*Assistant Examiner*—C. M. Bonner
*Attorney, Agent, or Firm*—John L. Haack

[57] ABSTRACT

A process for preparing silane metal oxides comprising reacting a metal oxide with an amine compound to form an amine metal oxide intermediate, and subsequently reacting said intermediate with a halosilane.

16 Claims, 2 Drawing Sheets

METAL OXIDE PROCESSES AND TONERS THEREOF

BACKGROUND OF THE INVENTION

This invention is generally directed to processes for surface treatment of silica containing materials. In embodiments, the present invention relates to the surface treatment of silica surfaces with a coupling agent such as a silane. Treatment of the silica surface results in desirable surface properties that are different or dissimilar from that of the original silica surface. Specific surface properties achieved with the processes of the present invention include enhanced hydrophobicity, reduced surface energy, surface charging ability, improved wear resistance, friction coefficient reduction, enhanced affinity for specific gases, solids or liquids, and enhanced specificity of catalytic activity. In other specific embodiments, the present invention is related to toner and developer compositions, and more specifically, the present invention relates to toners containing surface treated silica particles. In process embodiments, the surface treated silica or metal oxides containing silica are prepared by a two step process comprising treating silicon dioxide, such as fumed silica, glass and related metal oxides containing silica, with an amine, and then with a coupling component, such as a silane. In specific process embodiments, micron or submicron silicon dioxide particles and metal oxide powders containing silica, such as a fumed silica, are treated by the two step process to obtain silane surface treated particulate materials. More specifically, silicon dioxide charge control additives that assist in enabling negatively and positively charged toner particles can be prepared by treating, for example, hydrophilic AEROSIL ® A380 particles with a trialkyl amine like triethylamine, followed by reacting the intermediate product obtained with a silane coupling agent. Normally, metal oxides, such as many of the prior art silicon dioxides when incorporated into toners, provide or assist in providing a negative charge to the toner. The surface treated silica particles prepared by processes of the present invention when selected for toners may provide or assist in providing either positive and negative charge to the toner.

The surface treated metal oxide and silica particles, and toner compositions in embodiments of this invention may generally be prepared as described herein, and such processes comprise further aspects of the present invention. In embodiments of the present invention, the toner compositions are comprised of resin particles, pigment particles, and charge and performance enhancing additive surface treated metal oxide and or silica particles obtained with the processes of the present invention. One embodiment of the present invention relates to toner compositions comprised of a polymer resin or polyblend mixture, reference U.S. Pat. No. 4,556,624, the disclosure of which is totally incorporated herein by reference, of a first crosslinked polymer, a second polymer, pigment such as carbon black, a wax component, and a metal oxide, such as a surface treated silica charge enhancing additive obtained with the processes of the present invention, and optional surface additives such as silicas, metal salts, metal salts of fatty acids, or mixtures thereof. The developer compositions of the present invention are comprised of the toners illustrated herein and carrier particles. The carrier particles in embodiments of the present invention are comprised of a core free of a coating or with a polymeric coating, including, for example, a coating thereover generated from a mixture of polymers that are not in close proximity thereto in the triboelectric series, reference U.S. Pat. Nos. 4,935,326 and 4,937,166, the disclosures of which are totally incorporated herein by reference. Developer compositions comprised of the aforementioned toner and carrier particles are useful in electrostatographic or electrophotographic imaging and printing systems, especially xerographic imaging processes, including high speed processes, that is those generating from about 75 to about 125 copies per minute. Additionally, in embodiments, developer compositions comprised of the toners of the present invention and carrier particles of the aforementioned issued U.S. Patents are useful in imaging methods wherein relatively constant conductivity parameters are desired. Furthermore, in the aforementioned imaging processes the triboelectric charge on the carrier particles can be preselected depending, for example, on the polymer composition applied to the carrier core.

Advantages associated with the toners and developers of the present invention in embodiments thereof include desirable toner triboelectric charging characteristics, excellent toner flow properties, excellent toner admix characteristics, excellent color developer formulations for process color and transparency applications, stable performance for extended time periods exceeding, for example, 500,000 imaging test cycles in a xerographic imaging test fixture including those as illustrated in U.S. Pat. Nos. 4,394,429 and 4,368,970, the disclosures of which are totally incorporated herein by reference, the capability to vary the triboelectric charge on the carrier independent of the conductivity thereof; varying the conductivity on the carrier independent of the triboelectric charge thereof; use of the developer in imaging processes wherein a release fluid such as silicone oil is present; use of the developer in imaging processes wherein a minimum amount, or no release fluid, such as silicone oil is present; selection of the developer for electrophotographic, especially xerographic, heated fuser and pressure systems wherein the fuser roll coating is a silicone, reference for example the commercially available Xerox Corporation 1075 ® and 1090 ® imaging apparatuses; and the like.

Other advantages include providing a convenient and economic process for generating surface treated silica particles; toners and developers thereof; enhanced toner flow; enhanced toner transfer efficiency; and colorless particles for use in multicolor xerography.

Toners with charge additives, including those that impart a positive charge, or negative charge to the toner are known generally. Toner compositions with crosslinked resins and second resins, together with waxes and charge enhancing additives are disclosed, for example, in U.S. Pat. No. 4,556,624, the disclosure of which is totally incorporated herein by reference, and some of the prior art references mentioned thereon, and cited against the '624 patent. More specifically for enhancing the positive charging characteristics of toner compositions there can be incorporated in the toner charge enhancing additives, inclusive of alkyl pyridinium halides, reference U.S. Pat. No. 4,298,672, the disclosure of which is totally incorporated herein by reference, organic sulfate or sulfonate compositions, reference U.S. Pat. No. 4,338,390, the disclosure of which is totally incorporated herein by reference; distearyl dimethyl ammonium sulfate, reference U.S. Pat. Nos.

4,560,635 and 4,937,157, the disclosures of which are totally incorporated herein by reference; and other similar known charge enhancing additives including other quaternary ammonium salts. These additives are usually incorporated into the toner in an amount of from about 0.1 percent by weight to about 10, and preferably in an amount of from about 0.1 to about 5, and more preferably from about 0.3 to about 1.0 percent by weight. The triboelectric charge of the toner as determined, for example, by the known Faraday Cage process, or a charge spectrograph is from about positive or negative 5 to about 120, and preferably from about 10 to about 60 microcoulombs per gram. Toners with negative charge additives, such as aluminum complexes, reference U.S. Pat. No. 4,845,003 are also known. Moreover, other toner formulations containing metal oxides, such as tin oxides are generally known and function as a positive charge additive.

The following prior art, the disclosures of which are incorporated by reference in their entirety, are also mentioned:

Smith, U.S. Pat. No. 3,635,743 issued Jan. 18, 1972, discloses a reinforcing silica filler made by first treating a fine particle silica with ammonia and then treating the filler with, for example, hexamethyldisilazane and related compounds. The process of making reinforcing silica powder requires a finely divided silica having at least 0.2 weight percent absorbed water (col. 1, line 66 to 71).

A publication by Leyden et al., *J. Am. Chem. Soc.*, 1987, 109, 7141–7145, discloses amine catalyzed reactions of alkoxysilanes with silica wherein the amine and the alkoxysilane are both added at the same time in a solution to the silica. Reactions with methoxymethylsilanes when ammonia is present provides a monolayer or greater surface coverage and when ammonia is absent a 12 fold decrease in silane surface coverage is obtained.

A reference of general relevance is "The Chemistry of Silica," Iler R. K., Wiley, 1979.

A disadvantage in many prior art methods, for example, using solution coating methods, for preparing metal oxide particulate charge and flow additives is that solvents, particularly hydrogen bonding solvents, often cause irreversible agglomeration of submicron oxide particles thereby destroying the submicron particle dispersibility and flow improving capacity on toner surfaces. Optimal modification of toner charging properties usually requires high submicron particle dispersibility.

Other disadvantages of prior art methods for preparing silane surface treated metal oxides include: employing anhydrous, gas phase and high temperature conditions and therefore limits suitable silanes that are thermally stable that can be selected; the silane is not entirely chemically bonded to the metal oxide surface leading to variability in performance characteristics of the treated particles in various applications; the silane may polymerize prior to reacting with the particle surface resulting in lower yields; particle agglomeration; inhibition of bonding of the coupling agent to reactive surface groups, such as surface hydroxyl groups, resulting in residual unreactive groups with undesirable properties; contaminated product; and high processing costs.

Thus, there remains a need for a metal oxide surface treatment process that limits undesirable non-surface coupling agent polymerization. Further there is need for a surface treatment process where the coupling agent is completely or nearly completely chemically bonded to the surface. Furthermore, there is a need to provide more robust coatings, as provided when the coupling agent is covalently bound to the metal oxide surface.

There also remains a need for black or colored toners wherein toner flow and charging properties may be readily attained by the addition of surface treated metal oxide or silica particles of the present invention. Furthermore, there is a need for a silica particle surface treatment processes wherein the synthetic yields are high, such as from about 70 percent to nearly quantitative and without resorting to excessive isolation and purification procedures and which surface treatment processes provide a means for selectively modifying metal oxide and silica surfaces with varying amounts and various types of organosilane compounds to achieve engineered metal oxide surfaces and particle surfaces. In addition to the above, there is also a need for black and colored toners that are of excellent image resolution, non-smearing and of excellent triboelectric charging characteristics. In addition, there is a need for toners containing surface treated silica particles which possess triboelectric charge stability under varying ambient humidity conditions. Furthermore, there is a need for toners containing surface treated silica particles which possess excellent flow properties. In addition, there is a need for black or colored toners with low fusing temperatures, of from about 110° C. to about 150° C. as determined by known minimum fix temperature techniques and glass transition temperature measurements, of high gloss properties such as from about 50 gloss units to about 85 gloss units as measured by a VWR 75° gloss meter, of high projection efficiency, such as from about 75 percent efficiency to about 95 percent efficiency or more, and, in addition, result in developed images with minimal or no paper curl.

SUMMARY OF THE INVENTION

It is an object of the present invention to provide toner and developer compositions.

In another object of the present invention there are provided negatively charged toners with many of the advantages illustrated herein including excellent flow characteristics, especially for dispensed toner; desirable admix of, for example, from 15 seconds to about 1 minute in embodiments; stable toner tribocharging; resistance to a relative humidity of from about 10 to about 90 percent; and the like.

Additionally, in another object of the present invention, there are provided negatively charged toners containing surface treated silica particles prepared by processes of treating a core silica particle sequentially with an amine reactant and at least one silane coupling agent.

Another object of the present invention resides in the provision of developers with a toner comprised of the components of U.S. Pat. No. 4,556,624, the disclosure of which is totally incorporated herein by reference, with the surface treated silica particles obtained with the processes illustrated herein as surface additives thereon affording negatively charging toners.

In yet a further object of the present invention, there are provided economic processes for the preparation of surface treated silica particle surfaces of the formula $[(SiO_2)_x]—[(Si(X)_{n-1}[R_m]_{4-n})_y]$ and toner and developer compositions thereof.

In another object, the present invention is directed to processes for the preparation of toner compositions comprised of a copolymer resin, a pigment, charge control or enhancing surface treated metal oxide particles and optionally surface additives and imaging processes thereof.

These and other objects of the present invention can be accomplished in embodiments thereof by providing toner compositions comprised of pigment particles, resin or resin particles, and an organosilane outer layer or coating on a metal oxide or silica surface of the formula $[(SiO_2)_x]—[(Si(X)_{n-1}[R_m]_{4-n})_y]$ wherein $[(Si(X)_{n-1}[R_m]_{4-n})_y]$ represents a chemically bonded organosilane surface coating where Si is a silicon atom of the halo organosilane derived linking or coupling agent $[(Si(X)_n[R_m]_{4-n})_y]$; X is a leaving or departing group such as halogen; R is alkyl, alkenyl, alkynyl, aryl, alkaryl, aralkyl and halogenated derivatives thereof with, for example, methyl, ethyl, propyl, butyl, vinyl, phenyl, benzyl, propargyl, trichloromethyl phenyl, and the like, and mixtures thereof, having from about 1 to about 25 carbon atoms; m is an integer with a value of at least 1; n is an integer having a value of 1 to 3 and x and y are determined from the molar ratio of the silica component relative to silane component. For example, the x to y ratio may range from about 100:10 for very small metal oxide particles to about $100:10^{-9}$ for large metal oxide particles or metal oxide solids with small surface areas.

Preferred xerographic toners compositions are formulated with conventional toner particles comprised of polymeric resins and pigments and toner charge enhancing additive surface treated silica particles comprised of particles having a silane, silylated or silanized surface layer or layers comprised of, for example, an organosilane as an outermost coating on the surface of the silica particle. Toner formulations containing the charge enhancing additive surface treated particles provide optimum combinations of the aforementioned properties and afford an effective means by which to control the triboelectric charging and flow properties. The ability to control charging and flow characteristics of toner formulations is important for achieving high quality xerographic images and, in particular, for pictorial color applications.

Figure 1:
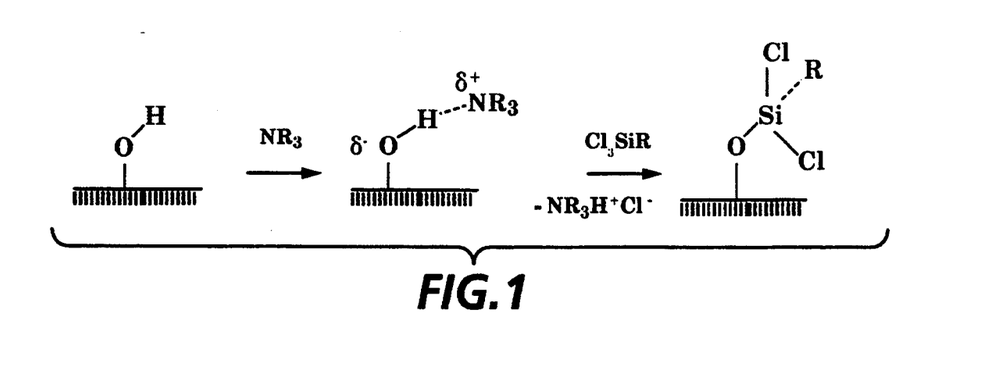
FIGS. 1–3 show the reaction of the silica particles with an amine compound and a halosilane.

In embodiments, the present invention comprises processes for preparing charge enhancing additive surface treated silica particles comprising reacting the silica particle surface with an amine compound to form an amine silanol intermediate, and reacting the amine silanol intermediate with a suitably reactive silane. In one embodiment, the process comprises: providing a silica surface of the type having Si—OH surface groups and surface water molecules present; reacting the silica surface with an amine compound of the type $NR^1_3$ to form an intermediate hydrogen bonded silica-amine surface species of the formula $Si_{(s)}—O—H \ldots NR^1_3$ where $Si_{(s)}$ designates a silicon atom on the surface of the silica or silica containing metal oxide; reacting said surface intermediate with a halo organosilane compound of the formula $SiX_nR_{4-n}$ to form a silica-silane surface compound of the formula $Si_{(s)}—O—SiX_{n-1}R_{4-n}$; and optionally isolating the silica-silane surface compound wherein x, n and R are as illustrated herein. The two step process of the present invention is illustrated in FIG. 1.

In the presence of surface water a two step process of the present invention is advantageous over coadsorption or simultaneous reaction of the amine and chlorosilane because polymerization of the silane compound in solution is greatly avoided or eliminated. The amine may be used in molar amounts of from less than, about the same as, or in excess of the molar amounts of surface hydroxyl groups, $Si_{(s)}—OH$. In another embodiment, when an excess molar quantity of the amine compound is used, for example, for convenience and efficiency of carrying out the two step process, it is desirable to remove any excess or unreacted amine from the reaction mixture prior to the introduction of the silane compound, for example, by reduced pressure evaporation or distillation methods. If excess or unreacted amine is not removed for the reaction mixture, addition of the silane compound may result in solution polymerization of the silane compound. Polymerization of the silane compound in solution in the presence of excess amine compound produces a result which is similar to what is observed when the amine and silane compound are coadsorbed with the silica.

In an alternative preparative process embodiment, the aforementioned reaction product of the metal oxide or silica core particle and the suitably reactive coupling agent is obtained with a relative molar ratio of the amine to the silane of about 1:1 and the molar quantity of the amine is less than the molar quantity of the Si—OH surface groups on the silica surface. The two step process of the present invention may thereby be used to build a submonolayer, that is a fractional monolayer, silane surfaces in a well defined manner. By employing substoichiometric amounts or less than stoichiometric amounts of the amine compound relative to the available silica surface silanol groups, $Si_{(s)}—OH$, the most acidic and accessible surface silanol groups are preferentially converted to the corresponding aforementioned silica-amine surface intermediate products of the formula $Si_{(s)}—O—H \ldots NR^1_3$, while the less accessible silanol groups will remain as unreacted silanol groups. Addition of the silane coupling compound leads to preferential reaction of the silica-amine surface intermediate species with the silane to afford a silica-silane surface product. In this manner, it is possible to regulate the hydrophobicity of the resultant silane modified silica surface to a high degree.

Figure 2:
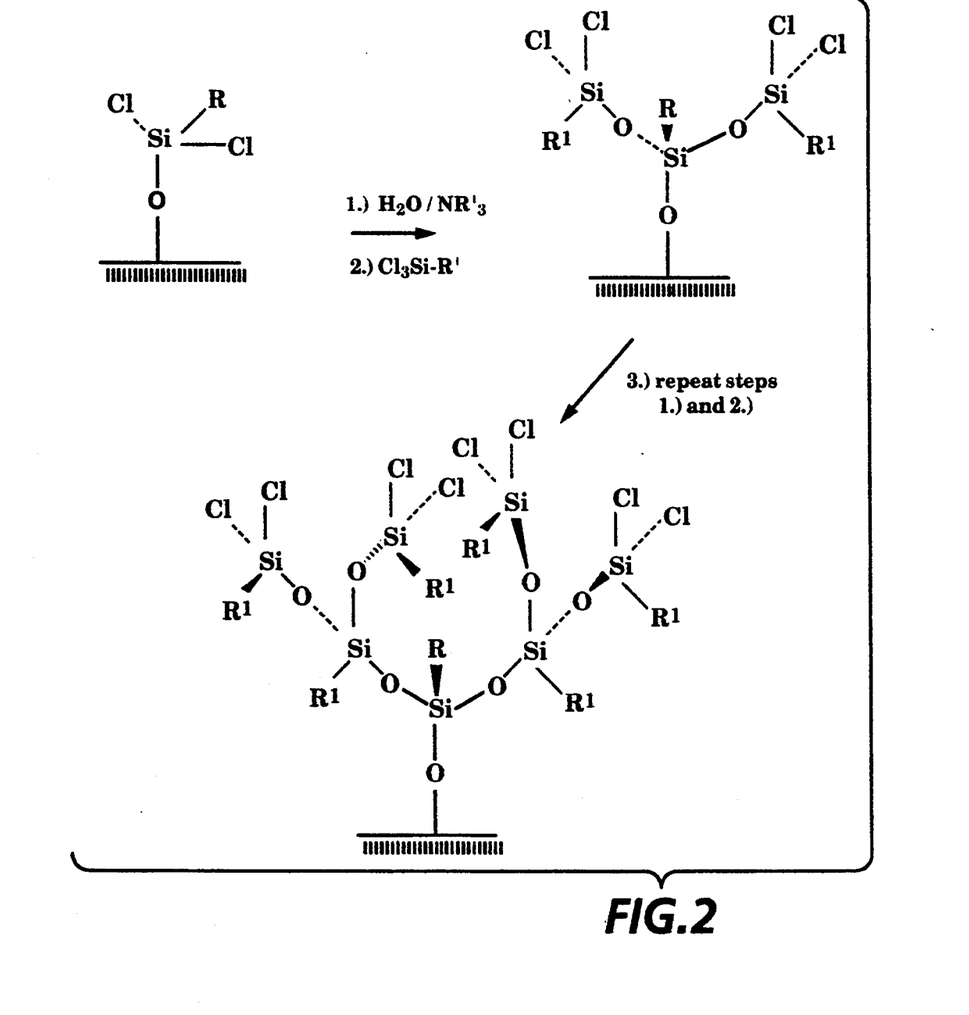
Figure 3:
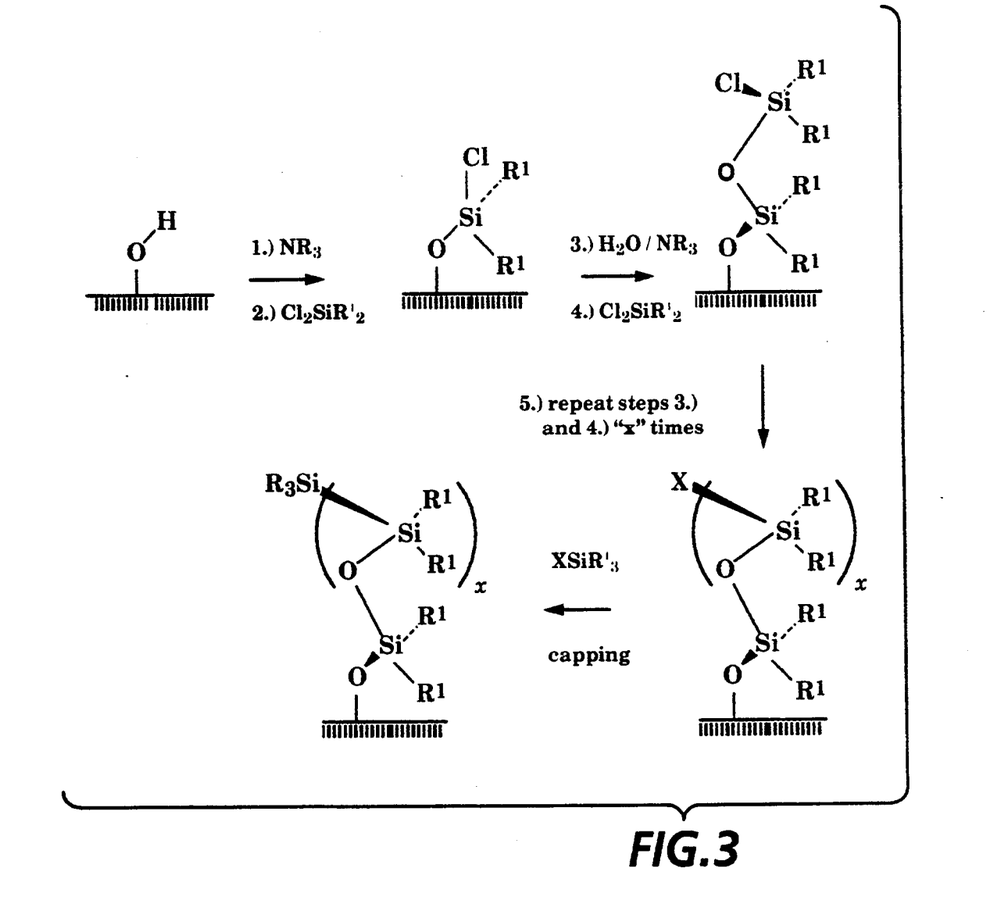

In yet another preparative process embodiment, is a multilayer process of modifying silica surfaces with organosilanes comprising: providing an anhydrous silica surface of the type having Si—OH surface groups present; reacting the silica surface with an amine compound to form an immediate hydrogen bonded silica-amine surface species having the formula $Si_{(s)}—O—H \ldots NR^1_3$; reacting the surface intermediate with a silane compound having at least two leaving groups to form a silica-silane surface compound having the formula $Si_{(s)}—O—SiX_{n-1}R_{4-n}$; reacting the silica-silane surface compound with a mixture of water and an amine to form a second intermediate silanol amine species having the formula $Si_{(s)}—O—SiX_{n-2}R_{4-n}—O—H \ldots NR^1_3$; sequentially repeating the steps reacting the silica surface with an amine, at least a difunctional silane, and a mixture of water and amine, x times, to form a multilayered silane compound on the silica surface of the formula $Si_{(s)}—O—SiX_{n-2}R_{4-n}—[O—SiX_{n-2}R_{4-n}]_x—O—H \ldots NR^1_3$, where x is equal to the number of times that the aforementioned steps are collectively and sequentially repeated of, for example, 1 to 15 and preferably 1 to 5 times; optionally reacting the multilayered silane compound with a terminating silane or silane capping agent having the formula $XSiR^1_3$ or $XN(SiR^1R^2R^3)_2$ where X is a leaving group halogen or alkoxy group and $R^1$, $R^2$, and $R^3$ may be the same or different and are alkyl, alkenyl, alkynyl, aryl, alkaryl, aralkyl, and halogenated derivatives thereof with 1 to about 25 carbons atoms; and optionally isolating the multilayered silane modified silica surface product. Examples of suitable silane capping agents include, but are not limited to, $(CH_3)_3SiCl$, $(CH_3)_3SiBr$, $(CH_3)_3SiF$, $CH_3(CH_2)_{17}Si(CH_3)_2Cl$, $(C_6H_5)_3SiCl$, $(CH_3)_3SiNH$-$Si(CH_3)_3$, $CH_2=CHSi(CH_3)_2Cl$ and $CF_3(CF_2)_6(CH_2)_2Si(CH_3)_2Cl$. In the absence of surface water the two step process of first treating with an amine and second with a silane can be extended by repeating the amine and silane reaction sequence to build a multilayered silane treated surface in a well defined manner. The nature of the multilayered surface silane depends on the type of silane selected. For example, a trifunctional silane yields dendrimer type surface structures, and difunctional silanes yield linear surface bound polymeric structures, examples of which are shown in FIGS. 2 and 3 respectively, with intermediate species not shown.

The charge enhancing additive surface treated metal oxide particles prepared by processes of the present invention may be formulated into toner compositions either by melt admixing with resin and pigment or preferably the charge enhancing additive particles of the present invention may be admixed onto the surface of preformed toner particles obtained through conventional means, for example, by comminution and jetting classification or toner particles formed by in situ methods. Similarly, developer compositions are known that are useful for imaging with toner compositions of the present invention. These, and other objects of the present invention can be accomplished in various embodiments of the present invention by providing toner and developer compositions. The toner in an embodiment is comprised of a resin, pigment particles, a surface treated metal oxide charge enhancing additive, which charge additive is obtained with the processes as illustrated herein. Carrier particles admixed with the toner to form a developer are comprised of a core of, for example, steel, iron powder, iron, ferrites, other known cores, and the like, which core may contain a polymer thereover at typical coating weights of, for example, from about 0.05 to about 3 weight percent, such as methyl terpolymers, and the like. Also, there may be selected as carriers, particles comprised of a core with a coating thereover comprised of a mixture of polymers. More specifically, the carrier particles selected can be prepared by mixing low density porous magnetic, or magnetically attractable metal core carrier particles with from, for example, between about 0.05 percent and about 3 percent by weight, based on the weight of the coated carrier particles, of a mixture of polymers until adherence thereof to the carrier core by mechanical impaction or electrostatic attraction; heating the mixture of carrier core particles and polymers to a temperature, for example, of between from about 200° F. to about 550° F. for a period of from about 10 minutes to about 60 minutes enabling the polymers to melt and fuse to the carrier core particles; cooling the coated carrier particles; and thereafter classifying the obtained carrier particles to a desired particle size.

DETAILED DESCRIPTION OF THE INVENTION

The silane surface treated metal oxide or silica charge additives of the present invention can be prepared in embodiments by the treatment of known silica particles, as purchased commercially, from Degussa in examples, with a nitrogen containing base or organic amine compound, and then with a coupling agent, for example, a halogenated silane coupling agent to provide surface treated silica particles of the formula $[(SiO_2)_x]-[(Si(X)_{n-1}[R_m]_{4-n})_y]$ illustrated herein and wherein substituents X and R are as illustrated herein.

Metal oxide or silica particles of the instant invention may be spherical or irregular in shape and which shape may be controlled in part by the surface reaction conditions selected for silylation reaction. The surface of the surface treated silica particles may be smooth or rough also depending in part upon the conditions selected for the reactions. For example, preparing multilayered surface modified silica particles using difunctional silanes may lead to extensive branching and result in particles which are microscopically more spherical in shape or with reduced surface roughness compared to the unmodified silica particle.

The use of bracketed notation is intended to indicate that a discrete and distinct layer or phase is present. In the situation of the silane coupling agent layer, the layer or layers may be quite thin, for example, several Angstroms to several hundred Angstroms. The term "silane surface treated silica particle" as used herein refers in embodiments to the formula $[(SiO_2)_x][Si(X)_{n-1}[R_m]_{4-n})_y]$ and the term "silane surface treated metal oxide particle" refers to the formula $[(M^1O_n)_{x'}(SiO_2)_x][Si(X)_{n-1}[R_m]_{4-n})_y]$. The $[(Si(X)_{n-1}[R_m]_{4-n})_y]$ represents the bonded organosilane outer layer surface where Si is a silicon atom of the organosilane linking or coupling agent; X if present (n=2 or 3) in the product represents a latent leaving group, that is, a leaving or departing group, for example, a halogen, which has survived the initial reaction sequence and is capable of undergoing subsequent coupling reactions or hydrolysis, or alternatively, X represents an oxygen atom or hydroxyl radical resulting from deliberate hydrolysis of latent halogen leaving groups; R is not a leaving or departing group and is a member of the group having between one and twenty five carbon atoms selected from alkyl, alkenyl, alkynyl, aryl, alkaryl, aralkyl, and the like, or halogenated derivatives thereof; m is an integer with a value of at least one; n is an integer of 1 to 3 and is determined by the silane coupling agent selected; x and x' define the respective molar ratio of the silica or silanol and metal oxide ($M^1O_n$) components of the metal oxide or mixed metal oxide surface or particle; and y is determined from the molar ratio of the silane component relative to the silica surface silanol groups, $Si_{(s)}$—OH, which are available for reaction. More specifically the silica surface modification processes of the present invention comprise treating any silica containing surface, including particulate silica with an average particle diameter of from between about 0.0050 to about 2 micrometers, with an amine in the presence or absence of surface water and subsequently contacting the resulting material with a coupling agent, for example, a halo organosilane coupling agent in stoichiometric equivalent amounts.

"Fumed silica" as used herein refers, for example, to comprehensively fine silica powder obtained by vapor phase oxidation of silicon halides and may also sometimes be called dry process silica. The method for preparation of fumed silica is known in the art and can be obtained, for example, by pyrolyric oxidation of gaseous silicon tetrachloride in an oxygen hydrogen flame.

Silica particles may be made by a vapor phase flame process according to "Vapor Phase Production of Colloidal Silica", by L. J. White and G. J. Duffy, *Industrial and Engineering Chemistry*, Vol. 51, Mar. 3, 1959, page 232; "Theory of particle Formation and Growth in Oxide Synthesis Flames", *Combustion Science & Technology*, Vol. 4, p. 47–57; and "Particle Growth in Flame II, Experimental Results for Silicas Particles", *Combustion Science & Technology*, G. D. Ulrich et al., Vol. 3, p. 233–239; and as disclosed in U.S. Pat. No. 5,135,832, the disclosures of which are totally incorporated herein by reference, and which process is similar to that used in making fumed silicas such as AEROSIL ® available from Degussa. Alternatively, the silica particles were obtained commercially.

The particle size of the metal oxide or silica particles selected to prepare the charge enhancing toner additive particles is from about 0.0050 to about 2 micrometers diameter, and the thickness of the organosilane outer or surface layer $[(Si(X)_{n-1}[R_m]_{4-n})_y]$ is from about 1 to about 15 molecular layers, preferably 1 to 5 molecular layers and most preferably a monolayer. Examples of suitable metal oxides are silica and silica containing metal oxides or mixed metal oxides of the formula $[(M^1O_n)_{x'}(SiO_2)_x]$, where silica, with formula $SiO_2$ also contains a metal oxide of the formula $(M^1O_n)_x$ selected from the group consisting of $SnO_2$, $TiO_2$, $Al_2O_3$, $CeO$, $BaO$, $ZrO_2$, $SrO$, $CaO$, $MgO$, $FeO$, $Fe_3O_4$, $Fe_2O_3$, $CrO_2$, $GeO$, $GaO$, $SeO_2$, $TeO_2$, and mixtures thereof. Mixtures include various well known silicate such as silicate glasses, for example, borosilicates, and inorganic mixed metal oxide materials having controlled pore sizes or internal cavities, for example, aluminosilicates and aluminophosphosilicates, and the like.

The amine compounds of formula $NR^1_3$ or $NR^1R^2R^3$ used to promote the silane reactions of the present invention are selected from the group where $R^1$, $R^2$ and $R^3$ may be the same or different, H, alkyl, aryl, cycloalkyl, alkenyl, alkynyl, and their derivatives, containing, but not limited to F, Cl, Br, 1, O, and N. Substituents $R^1$ and $R^2$ may also be part of an aliphatic or aromatic ring. Examples of suitable bases that may be employed are non-, mono-, di- and tri-substituted alkyl and aryl amines and include, but are not limited to, $NH_3$, methyl amine, dimethylamine, trimethylamine, methylethylamine, methylethylisobutyamine, dodecylamine, triethylamine, perfluorotriethylamine, perchlorotrimethylamine, pyridine, ethanolamine, 1,4-dimethylaminobutane, and the like, and mixtures thereof. A desirable but non-essential feature of the amine compound used is that the amine compound selected should possess a sufficiently high vapor pressure so that any excess amine, that is, amine in excess of the stoichiometric equivalent $Si_{(s)}$—OH or silanol groups may be easily removed from the reaction mixture by reduced pressure or controlled evaporation. The interaction of amines and nitrogen containing bases with silica has been documented, for example, see F. H. Van Cauwelaert et al., *Discuss. Faraday Soc.*, 1972, (32), 66 the disclosures of which are incorporated in its entirety by reference.

Many coupling agents useful in forming the outermost silane surface layer are known. They include but are not limited to: $CF_3(CF_2)_6(CH_2)_2Si(Cl)_3$; $CF_3(CF_2)_6CH_2O(CH_2)_3Si(Cl)_3$; $(CF_3)_2CFO(CH_2)Si(Cl)_3$; $CH_3Si(Cl)_3$; $(CH_3)_2SiCl_2$, $(CH_3)_3SiCl$, $CH_3SiBr_3$, $CH_3SiF_3$, $CH_3SiI_3$, $C_2H_5Si(Cl)_3$; $CH_2=CHSi(Cl)_3$; $CH_2=C(CH_3)COO(CH_2)_3Si(Cl)_3$; $CH_3C_6H_4Si(Cl)_3$; $BrCH_2C_6H_4Si(Cl)_3$; epoxy O—CH$_2$—CH—CH$_2$O(CH$_2$)$_3$Si(Cl)$_3$; $C_6H_5Si(Cl)_3$; $Cl(CH_2)_3Si(Cl)_3$; $BrC_6H_4Si(Cl)_3$; and the like, as disclosed in *Silane Coupling Agents*, by Edwin P. Plueddemann, 2nd Ed., Plenum Press, 1991, ISBN 0-306-43473-3, the disclosure of which is incorporated herein in its entirety. A number of other preferred organosilane coupling or linking agents are disclosed in *Silicon Compounds, Register and Review*, published by Petrarch Systems, Bristol, PA (1982), for example, trialkylsilylchlorides and dialkylsilyldichorides, the disclosures of which is totally incorporated herein by reference.

A preferred class of coupling agents, of the formula $Si(X)_n[R_m]_{4-n}$ useful in forming the outermost surface layer $[(Si(X)_{n-1}[R_m]_{4-n})_y]$ is alkyl trihalosilanes, $SiX_3R$ where X is a leaving or departing group such as halogen; R is alkyl, alkenyl, alkynyl, aryl, alkaryl, aralkyl, and halogenated derivatives thereof with, for example, 1 to about 25 carbon atoms; m is an integer with a value of at least 1; n is an integer having a value of 1 to 3 and x and y are determined from the molar ratio of the silica component relative to silane component. A particularly preferred coupling agent in embodiments of the present invention is octadecyl trichlorosilane.

Surface treated silica particles of the present invention may have more than one surface layer of a silane compound, that is, for example, by repeating the steps of intermediate hydrolysis and treatment with an appropriate amount of a reactive di- or tri-functional silane, multiple silane layers, of up to about a 15 layer thickness, may be built up on the surface of the metal oxide or silica particle. Optionally, dissimilar silanes may be used sequentially or repeatedly to build up an engineered multilayer or onion skin structure of dissimilar silanes to provide desired hydrophobicity or preferred triboelectric properties.

The aforementioned surface treated silica particles prepared by processes of the present invention may have the formula $[(SiO_2)_x]$—$[(Si(X)_{n-1}[R_m]_{4-n})_y]$ wherein the relative molar ratios of x to y is of about 100:10 to about 100:0.01 depending on the size and surface area of the core silica particles reflecting a range from a monolayer to multiple layers of silane on the core silica or metal oxide particle. That is, the aforementioned metal oxides comprised of core particles $[(M^1O_n)_{x'}(SiO_2)_x]$ or $[(SiO_2)_x]$ comprise a majority of the molar composition and weight of the treated particles. In other instances, for example, when the metal oxide or silica surface is a macroscopic flat plate the molar ratio of silica or metal oxide to silane surface layer is very large, for example $100:10^{-9}$ or larger.

In surface pretreatments with an amine, the amine is preferably provided in a range of from submonolayer amounts to an excess of about 10 fold depending on the desired silica or metal oxide surface coverage. Between multiple silane surface treatment steps the product is preferably evacuated at room temperature for at least 1 minute in order to remove unreacted amine reagents.

The toner in an embodiment of the present invention is comprised of a resin blend of two polymers, a first crosslinked polymer, a second uncrosslinked polymer, a pigment such as carbon black, or a mixture of pigments of, for example, carbon black and magnetites, a wax component, and present on the toner surface are silane surface treated metal oxide or silica charge enhancing additive particles; and optional performance enhancing additive components. In another embodiment of the present invention, the negatively charged toner is comprised of resin particles, pigment particles, and the silane surface treated silica charge additive. The triboelectric charge on the toner can vary depending on a number of factors, such as the resin selected, the amount of charge additives used, and the like. However, in general it is preferable that the additive impart to the toner the maximum positive, or negative charge, depending on which is desired for the particular application, for the minimum amount of additive added, and that the charge of the toner be stable with ambient humidity.

Illustrative examples of toner polymers useful in toner compositions of the present invention include, for example, styrene acrylates, styrene methacrylates, styrene butadienes, polyesters, and the like, reference U.S. Pat. No. 4,556,624, the disclosure, and crosslinked polyesters disclosed in co-pending applications U.S. Ser. Nos. 07/814,641 and 07/817,782 (D/91117 and D/91117Q) filed Dec. 30, 1991, the disclosures of which are totally incorporated herein by reference.

Generally, from about 1 part to about 5 parts by weight of toner particles are mixed with 100 parts by weight of the carrier particles to enable the developer. The toner can be subjected to known attrition and classification for the purpose of enabling the toner particles with a known average size diameter of from about 5 to about 25 microns, and preferably from about 9 to about 15 microns.

Numerous well known suitable pigments or dyes can be selected as the colorant for the toner particles including, for example, carbon black, like Regal 330 ®, channel black, Vulcan black, nigrosine dye, lamp black, and mixtures thereof. The pigment, which is preferably carbon black, should be present in a sufficient amount to render the toner composition highly colored. Thus, the pigment particles are present in amounts of from about 5 percent by weight to about 15 percent by weight, and preferably from about 2 to about 10 weight percent based on the total weight of the toner composition, however, lesser or greater amounts of pigment particles may be selected.

When the above illustrated pigment particles are mixed with magnetites, which magnetites are known and can be comprised of a mixture of iron oxides ($FeO \cdot Fe_2O_3$) including those commercially available as Mapico Black, the mixtures are present in the toner composition in for example, an amount of from about 10 percent by weight to about 50 percent by weight, and preferably in an amount of from about 12 percent by weight to about 25 percent by weight. In an embodiment of the present invention, the toner can be comprised of a mixture of magnetite, of from about 12 to about 20 weight percent, and pigment, such as carbon black, in an amount of from about 4 to about 15 weight percent. In another embodiment of the present invention, the toner can be comprised of a mixture of magnetite of from about 25 to about 35 weight percent, and pigment, such as carbon black, in an amount of from about 2 to about 10 weight percent.

Also encompassed within the scope of the present invention are colored toner compositions comprised of a toner blend and as pigments or colorants, red, blue, green, brown, magenta, cyan and/or yellow particles, as well as mixtures thereof. More specifically, illustrative examples of magenta materials that may be selected as pigments include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro 2,5-dimethoxy acetoacetanilide, permanent yellow FGL, and the like. These pigments are generally present in the toner composition in an amount of from about 1 weight percent to about 15 weight percent based on the weight of the toner resin particles.

The toners may contain a wax with, for example, an average molecular weight of from about 500 to about 20,000 and preferably from about 1,000 to about 6,000, examples of which include polyethylenes, polypropylenes, and the like, reference for example British Patent 1,442,835, the disclosure of which is totally incorporated herein by reference, and U.S. Pat. No. 4,556,624, the disclosure of which is totally incorporated herein by reference. Specific waxes include Viscol 660-P, Viscol 550-P available from Sanyo Kasei K. K., Epolene N-15, and the like. Generally, the wax is present in an effective amount of, for example, from about 1 to about 15, and preferably from about 2 to about 10 weight percent. While not being desired to be limited by theory, it is believed that the wax has a number of functions including enabling an increased fusing latitude, 250° F., for example, increased stripping performance, and as a lubricant.

The toner composition may also include other surface additives, in an effective amount of, for example, from about 0.1 to about 5, and preferably from about 0.1 to about 1.5 weight percent, such as colloidal silicas, including AEROSIL ® R972, metal salts or oxides such as titanium oxide, magnesium oxide, tin oxide, surface treated and untreated composite metal oxide particles disclosed in copending application U.S. Ser. No. (not yet assigned) (D/92098) filed Nov. 12, 1992, and the like, which metal oxides can assist in enabling negatively charged toners, and metal salts of fatty acids, such as zinc stearate, magnesium stearate, and the like, reference U.S. Pat. Nos. 3,655,374; 3,720,617; 3,900,588 and 3,983,045, the disclosures of which are totally incorporated herein by reference. While not being desired to be limited by theory, it is believed that the surface additives, especially the silicas, enable excellent toner flow characteristics, enhanced and stable triboelectric values, improved stable admix characteristics, and the like.

The toner composition of the present invention can be prepared by a number of known methods including melt blending the toner resin particles and pigment particles, or colorants, wax, and silane surface treated metal oxide or silica charge additive, in an extruder followed by mechanical attrition. Other methods include those well known in the art such as spray drying, Banbury melt mixing, and the like. In one extrusion method, a dry bend of the toner components is added to the extruder feeder, followed by heating, to enable a melt mix, which heating in some instances is accomplished at 450° F., and shearing in an extruder, such as the Werner Pfleiderer ZSK 53, cutting the strands of toner exiting from the extruder, and cooling the resulting toner in, for example, water. Thereafter, the toner may be attrited with, for example, an attritor available from Alpine Inc., and classified with, for example, a Donaldson classifier, resulting in toner particles with an average diameter as indicated herein, and in an embodiment of from about 9 to about 20 microns, for example. There can then be added to the resulting toner product surface additives by mixing, for example, in a Lodige Blender the toner and additives, such as composite metal oxide particles with or without a surface or, for example, AEROSIL ®, wherein the surface additives particles may be mechanically impacted on and into the toner surface or alternatively the surface additive particles are dispersed throughout and onto the toner particle surfaces by mild blending wherein the surface additives are not fixed to the surface of the toner particles. The developer compositions can then be prepared by mixing in a Lodige blender the toner with surface additives and carrier particles for effective mixing times of, for example, from about 1 to about 20 minutes.

The toner and developer compositions of the present invention may be selected for use in electrostatographic imaging processes containing therein conventional photoreceptors, including inorganic and organic photoreceptor imaging members. Examples of imaging members are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. No. 4,265,990, the disclosure of which is totally incorporated herein by reference, and other similar layered photoresponsive devices. Examples of generating layers are trigonal selenium, metal phthalocyanines, metal free phthalocyanines and vanadyl phthalocyanines. As charge transport molecules, there can be selected the aryl diamines disclosed in the '990 patent. Also, there can be selected as photogenerating pigments, squaraine compounds, thiapyrillium materials, titanyl phthalocyanines, especially Type I, Ia, IV, and the like. These layered members may be charged negatively or positively, thus requiring a charged toner of opposite charge. Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference.

Images may be obtained with developer compositions of the instant invention which have acceptable solids, excellent halftones and desirable line resolution with acceptable or substantially no background deposits at, for example, a relative humidity of from about 10 to about 90 percent as determined, for example, by known standard visual and optical copy quality characterization methods.

In embodiments, the present invention is directed to a process for preparing silane metal oxides comprising reacting a metal oxide with an amine compound to form an amine metal oxide intermediate and subsequently reacting said intermediate with a halosilane; and a process for preparing silane modified silica surfaces comprising reacting a silica surface with an amine compound to form an amine silanol intermediate and subsequently reacting said intermediate with a halosilane.

The following examples are being supplied to further define the present invention, it being noted that these examples are intended to illustrate and not limit the scope of the present invention. Parts and percentages are by weight unless otherwise indicated. Comparative Examples are also provided.

COMPARATIVE EXAMPLE I

Trichloromethylsilane and Silica at 25° C. Evidence for the chemical attachment of trichloromethylsilane (TCMS) to the silica surface is provided by infrared spectroscopy using a thin film technique described by C. P. Tripp and M. L. Hair, *Langmuir*, 1991, (7), 923. A thin film of AEROSIL ® A 380 containing about 0.1 mg/cm$^2$ supported on a CsI disk was evacuated at 400° C. for 15 minutes. The disk was then cooled to room temperature under vacuum and an infrared spectrum was recorded. This pretreatment at 400° C. under vacuum removed all adsorbed molecular water from the silica surface. The silica was exposed to excess TCMS vapor (about 100 mmole/g silica) for 1 hr (hour) at room temperature (25° C.) followed by evacuation for 15 minutes. Difference spectra were computed by subtracting the spectrum acquired before TCMS treatment from the spectrum recorded after TCMS treatment. In this manner, bands located in the positive direction represent bonds which have formed on the surface and bands appearing in the negative direction represent bonds which have been removed from the surface. In the infrared difference spectra there were neither positive or negative bands which indicate that no reaction had occured between the trichloromethylsilane and the silanol surface groups. The material isolated was identical to the starting silica material.

COMPARATIVE EXAMPLE II

Reaction of Trichloromethylsilane and Silica at 300° C. The procedure of Comparative Example I was repeated with the exception that the silica disk was exposed to the TCMS vapor at 300° C. for 15 minutes, evacuated at 300° C. for 15 minutes and then cooled to room temperature. Infrared difference spectra indicated that a reaction had occured between the trichloromethylsilane and the silanol surface groups as evidenced by a negative band at 980 cm$^{-1}$, that is loss of Si—OH groups, a positive band at 1100 cm$^{-1}$, indicating formation of Si—O—Si linkages, the positive bands at 1260 and 800 cm$^{-1}$, indicating the presence of Si—CH$_3$ and positive bands at 574 and 473 cm$^{-1}$, indicating Si—Cl linkages.

EXAMPLE III

Reaction of Trichloromethylsilane and an Amine Treated Silica at 25° C. The procedure of Comparative Example I was repeated with the exception that the silica sample after evacuation at 400° C. and cooling to room temperature was treated with excess triethylamine (500 mmole/g) for 1 minute followed by evacuation at room temperature for 15 minutes. The silica was then exposed to the trichloromethylsilane (TCMS) vapour at room temperature as outlined in Comparative Example I. Infrared difference spectra indicated that a reaction had occured between the trichloromethylsilane and the amine treated silica. The infrared spectra was identical to the aforementioned difference spectra for the product prepared at 300° C. of Comparative Example II after the contribution of triethylammonium hydrogen chloride, $N(C_2H_5)_3H^+Cl^-$, a salt formed in the reaction, had been electronically subtracted out.

EXAMPLE IV

Preparation of Multilayer Silane Silica Particles by Reaction of Trichlormethylsilane (TCMS) with an Amine Treated Silica at 25° C. The silica obtained by the procedure outlined in Example III was treated with excess $H_2O$/triethylamine mixture in a molar ratio of about 1:50 for 1 minute followed by evacuation at room temperature (25° C.) for 5 minutes. The silica was then exposed to the TCMS vapor at room temperature as outlined in Example I. A multilayered silane layer was produced by repeating the sequential $H_2O$/triethylamine and TCMS treatment three times. Infrared difference spectra indicated that a new silane layer had formed between each TCMS treatment evidenced by an increase in a positive band at 1035 cm$^{-1}$, indicating formation of $Si_{(s)}$—O—Si linkages, and the increase in the positive bands due to Si—$CH_3$ and Si—Cl linkages.

EXAMPLE V

End Capping a Multilayer Silane Layer by Reaction with An Trimethylchlorosilane and an Amine Treated Silica at 25° C. The silica obtained by the procedure outlined in Example IV was treated with excess $H_2O$/triethylamine mixture in a molar ratio of about 1:50 for 1 minute followed by evacuation at room temperature (25° C.) for 5 minutes. The silica was then exposed to the vapor of end capping silane, trimethylchlorosilane, at room temperature for 1 minute followed by evacuation for 5 minutes. The silica was then subjected to a further $H_2O$/triethylamine and TCMS treatment. This final treatment did not increase the multilayer silane layers as evidenced by no change in the bands due to $Si_{(s)}$—O—Si, Si—$CH_3$ or Si—Cl linkages.

COMPARATIVE EXAMPLE VI

Preparation of Silica Particles Surface Treated with Octadecyl Trichlorosilane-AEROSIL® A380/OTS. The addition of OTS to silica was performed using an in situ mixing cell. The cell and its operation are described in detail by C. P. Tripp and M. L. Hair in *Langmuir*, 1992, (8), 1961. AEROSIL® A380 (200 mg) as a powder was evacuated at room temperature for 30 minutes to remove molecular water from the surface. An evacuated glass bulb containing about 75 ml of an organic solvent such as carbon tetrachloride, methylene chloride, cyclohexane, and or toluene was degassed by several freeze-thaw cycles and was used to deliver the solvent under vacuum to the cell containing the degassed silica. The silica suspension was stirred for 30 minutes prior to addition of the OTS. The OTS (56 mg) contained in 10 ml of solvent was added to the silica suspension from an evacuated glass bulb. The suspension was then stirred for 2 hrs and the reaction was monitored by infrared spectroscopy as described in the above mentioned reference. The IR spectra showed that the OTS did not effectively attach to the silica surface hydroxyl radical, as indicated by no change in the band due to Si—O—H at 3747 cm$^{-1}$. The suspension was then transferred from the cell and the solvent was removed by evaporation.

EXAMPLE VII

Preparation of Silica Surface Treated with Octadecyl Trichlorosilane AEROSIL® A380/TEA/OTS. The procedure of Comparative Example VI was repeated with the exception that the silica after evacuation at room temperature was exposed to excess vapor of triethylamine (TEA, 100 mmole/g) for 5 minutes followed by evacuation for 15 minutes. The solvent and OTS was then added according to the procedure outlined in Example VI. The IR spectra showed that the OTS has been effectively attached to the silica surface hydroxyl radical, as indicated by the absence of the band due to the Si—O—H at 3747 cm$^{-1}$.

EXAMPLE VIII

Preparation of Silica Particles Surface Treated with Octadecyl Trichlorosilane of the Formula $[(SiO_2)_x][(OSi—C_{18}H_{37})_y]$-AEROSIL® A380/TEA/OTS, $CH_3OH/H_2O$ washed and dried. The procedure of Example VII was repeated with the exception that after removal of the solvent by evaporation the treated silica product was washed three times with 100 mL of a 20:80 $H_2O$/methanol solution to remove the triethylammonium hydrogen chloride salt. The removal of the triethylammonium chloride was confirmed by infrared spectroscopy.

COMPARATIVE EXAMPLE IX

Preparation of —Si—$Ph_3$ on Silica Particles-A380/TCPS, $CH_3OH/H_2O$ washed and dried. The procedure of Comparative Example VI was repeated with the substitution of 56 mg of triphenylchlorosilane in place of 56 mg OTS. After removal of the solvent by evaporation the treated silica product was washed three times with 100 mL of a 20:80 $H_2O$/methanol solution to remove the triethylammonium hydrogen chloride salt. The IR spectra showed that the OTS had not effectively attached to the silica surface hydroxyl radical, as indicated by the presence of the band due to the Si—O—H at 3747 cm$^{-1}$.

EXAMPLE X

Preparation of Surface Treated Silica Particles of the Formula $[(SiO_2)_x][(OSi—Ph_3)_y]$-A380/TEA/TCPS, $CH_3OH/H_2O$ washed and dried. The procedure of EXAMPLE VII was repeated with the exception that 56 mg of triphenylchlorosilane was used instead of 56 mg of OTS. After removal of the solvent by evaporation the treated silica product was washed three times with 100 mL of a 20:80 $H_2O$/methanol solution to remove the triethylammonium hydrogen chloride salt. The IR spectra showed that the triethylammonium hydrogen chloride salt was removed and the OTS had been effectively attached to the silica surface hydroxyl radical, as indicated by the absence of the band due to the Si—O—H at 3747 cm$^{-1}$.

COMPARATIVE EXAMPLE XI

A toner comprised of about 89.0 percent of a copolymer of styrene n-butyl methacrylate (about 57/43 weight ratio), 10 percent RAVEN 5750® carbon black and 0.5% of cetyl pyridinium chloride and 0.5% of a commercial sample of AEROSIL® A380, a hydrophilic fumed silica without a surface additive or silane treatment, all by weight, was ball milled for 30 minutes with one-quarter inch steel balls. The resulting toner was mixed at 2% weight with a 90 micrometer ferrite carrier solvent-coated with 0.5% of a terpolymer of methyl methacrylate, styrene and vinyl triethoxy silane (about 80/14/6 by weight). After roll mill mixing for 15 minutes, the developer triboelectric charge, measured as the charge-to-mass ratio, Q/M, as determined by the known charge blow off method, was −28 microcoulombs per gram as shown in Table I for this untreated silica at 20% relative humidity. As shown in Table II this untreated silica was least hydrophobic, affording the largest relative amount of water. As shown in Table II, this untreated silica had the highest humidity sensitivity for Q/M, as measured by the ratio of Q/M at 20% relative humidity to Q/M at 80% relative humidity.

COMPARATIVE EXAMPLE XII

A xerographic developer was prepared as in Example XI, except that the AEROSIL ® A380 surface treated with physisorbed OTS from Example VI was used instead of AEROSIL ® A380. After roll mill mixing for 15 minutes, the developer triboelectric charge, measured as the charge-to-mass ratio, Q/M, as determined by the known charge blow off method, was −25 microcoulombs per gram at 20% relative humidity. As shown in Table I, there was no effective change in the charge level of the toner with this treated silica compared to the value of −28 microcoulombs per gram for the untreated AEROSIL ® A380 of Comparative Example XI. As shown in Table II the treated silica of this example was more hydrophobic than the untreated AEROSIL ® A380 of Comparative Example XI., affording a lower relative amount of water. As shown in Table II, this treated silica had a low humidity sensitivity for Q/M, as measured by the ratio of Q/M at 20% relative humidity to Q/M at 80% relative humidity.

EXAMPLE XIII

A xerographic developer was prepared as in Example XI, except that the AEROSIL ® A380 surface treated with TEA and surface attached OTS of Example VII was used instead of AEROSIL ® A380. After roll mill mixing for 15 minutes, the developer triboelectric charge, measured as the charge-to-mass ratio, Q/M, as determined by the known charge blow off method, was −36 microcoulombs per gram at 20% relative humidity. As shown in Table I, there was a slight effective change to increase the negative charge level of the toner with the treated silica of this example compared to the value of −28 microcoulombs per gram for the untreated AEROSIL ® A380 of Comparative Example XI, and −25 microcoulombs per gram for the treated AEROSIL ® A380 of Comparative Example XII. As shown in Table II this treated silica was more hydrophobic than either the untreated AEROSIL ® A380 of Comparative Example XI or the treated AEROSIL ® A380 of Comparative Example XII, having a lower relative amount of water. As shown in Table II, this treated silica has a lower humidity sensitivity for Q/M, as measured by the ratio of Q/M at 20% relative humidity to Q/M at 80% relative humidity, than the untreated AEROSIL ® A380 of Comparative Example XI.

EXAMPLE XIV

A xerographic developer was prepared as in Example XI, except that the AEROSIL ® A380 surface treated with TEA and surface attached OTS with washing and drying treatment from Example VIII was used instead of AEROSIL ® A380. After roll mill mixing for 15 minutes, the developer triboelectric charge, measured as the charge-to-mass ratio, Q/M, as determined by the known charge blow off method, was −64 microcoulombs per gram at 20% relative humidity. As shown in Table I, there was a large effective change to increase the negative charge level of the toner with the treated silica of this example compared to the value of only −28 microcoulombs per gram for the untreated AEROSIL ® A380 of Comparative Example XI, and only −25 microcoulombs per gram for the treated AEROSIL ® A380 of Comparative Example XIII. As shown in Table II the toner with this treated silica was more hydrophobic than either the untreated AEROSIL ® A380 of Comparative Example XI or the treated AEROSIL ® A380 of Comparative Example XII, having a lower relative amount of water. As shown in Table II, this treated silica has a low humidity sensitivity for Q/M, as measured by the ratio of Q/M at 20% relative humidity to Q/M at 80% relative humidity. The treated silica of this inventive example shows an effective change in the negative charge of the toner from that of the untreated AEROSIL ® A380, with low humidity sensitivity of the triboelectric charge, and low water content indicating hydrophobicity. None of the Comparative Examples in Tables I and II using treated silicas show all three of these properties simultaneously.

COMPARATIVE EXAMPLE XV

A xerographic developer was prepared as in Example XI, except that AEROSIL ® A380 surface treated with the surface physisorbed TPCS from Comparative Example IX was used instead of AEROSIL ® A380. After roll mill mixing for 15 minutes, the developer triboelectric charge, measured as the charge-to-mass ratio, Q/M, as determined by the known charge blow off method, was −33 microcoulombs per gram. As shown in Table I, there was no effective change in the charge level of the toner with the treated silica of this comparative example compared to the value of −28 microcoulombs per gram for the untreated AEROSIL ® A380 of Comparative Example XI, and −25 microcoulombs per gram for the treated AEROSIL ® A380 of Comparative Example XII.

EXAMPLE XVI

A xerographic developer was prepared as in Example XI, except that the AEROSIL ® A380 surface treated with TEA and surface attached TPCS from Example X was used instead of AEROSIL ® A380. After roll mill mixing for 15 minutes, the developer triboelectric charge, measured as the charge-to-mass ratio, Q/M, as determined by the known charge blow off method, was −10 microcoulombs per gram at 20% relative humidity. As shown in Table I, there was a large effective change in the charge level of the toner to less negative charge with the treated silica of this example compared to the value of −28 microcoulombs per gram for the untreated AEROSIL ® A380 of Comparative Example XI, and −25 microcoulombs per gram for the treated AEROSIL ® A380 of Comparative Example XII.

COMPARATIVE EXAMPLE XVII

A xerographic developer was prepared as in Example XI, except that a commercial sample of AEROSIL ® R812, a hydrophobic fumed silica was used instead of AEROSIL® A380. After roll mill mixing for 15 minutes, the developer triboelectric charge, measured as the charge-to-mass ratio, Q/M, as determined by the known charge blow off method, was −60 microcoulombs per gram at 20% relative humidity. As shown in Table II, there was a large effective change in the charge level of the toner to more negative charge with the treated silica of this comparative example compared to the value of −28 microcoulombs per gram for the untreated AEROSIL® A380 of Comparative Example XI. As shown in Table II this treated silica was more hydrophobic than either the untreated AEROSIL® A380 of Comparative Example XI or the treated AEROSIL® A380 of Comparative Example XII, giving a lower relative amount of water. As shown in charge level of the toner to a more negative charge with the treated silica of this comparative example compared to the value of −28 microcoulombs per gram for the untreated AEROSIL® A380 of Comparative Example XI. As shown in Table II this treated silica was more hydrophobic than either the untreated AEROSIL® A380 of Comparative Example XI or the treated AEROSIL® A380 of Comparative Example XII, having a lower relative amount of water. As shown in Table II, this commercial treated silica has a much higher humidity sensitivity for Q/M, as measured by the ratio of Q/M at 20% relative humidity to Q/M at 80% relative humidity, than the AEROSIL® A380 with the inventive amine and chlorosilane treatment of EXAMPLE XIV.

TABLE I

| Example | Toner Additive Preparation | $Q/M^2$ of Toner with Toner Additive at 20% RH (in μC/g) | Effective Change in Charge Level of AEROSIL® A380 |
|---|---|---|---|
| Comparative Example XI | AEROSIL® A380 | −28 | Control |
| Comparative Example XII | AEROSIL® A380/OTS | −25 | NO |
| Example XIII | AEROSIL® A380/TEA/OTS | −36 | YES slightly more negative |
| Example XIV | AEROSIL® A380/TEA/OTS, CH$_3$OH/H$_2$O washed and dried | −64 | YES more negative |
| Comparative Example XV | AEROSIL® A380/TPCS[1], CH$_3$OH/H$_2$O washed and dried | −33 | NO |
| Example XVI | AEROSIL® A380/TEA/TPCS[1], CH$_3$OH/H$_2$O washed and dried | −10 | YES less negative |

[1]TPCS—triphenyl chlorosilane, Ph$_3$SiCl
[2]Q/M—charge to a mass ratio in microcoulombs per gram

TABLE II

| | | Q/M of Toner with Toner Additive (in μC/g) | | Humidity Sensitivity Ratio | Relative % H$_2$O on silica by IR (no toner) | |
|---|---|---|---|---|---|---|
| Example | Toner Additive Preparation | 20% RH | 80% RH | Q/M @20% RH / Q/M @80% RH | 20% RH | 80% RH |
| Comparative Example XI | AEROSIL® A380 | −28 | −5 | 5.6 | 97 | 100 |
| Comparative Example XVII | AEROSIL® R812 | −60 | −22 | 2.7 | 21 | 19 |
| Comparative Example XVIII | AEROSIL® R972 | −62 | −31 | 2.0 | 14 | 16 |
| Comparative Example XII | AEROSIL® A380/OTS | −25 | −20 | 1.3 | 38 | 38 |
| Example XIII | AEROSIL® A380/TEA/OTS | −36 | −14 | 2.6 | 5 | 15 |
| Example XIV | AEROSIL® A380/TEA/OTS, CH$_3$OH/H$_2$O washed and dried | −64 | −40 | 1.6 | 18 | 22 |

Table II, this commercial treated silica has a much higher humidity sensitivity for Q/M, as measured by the ratio of Q/M at 20% relative humidity to Q/M at 80% relative humidity, than the AEROSIL® A380 with the inventive amine and chlorosilane treatment of EXAMPLE XIV.

COMPARATIVE EXAMPLE XVIII

A xerographic developer was prepared as in Example XI, except that commercial sample of AEROSIL® R972, a hydrophobic fumed silica, was used instead of AEROSIL® A380. After roll mill mixing for 15 minutes, the developer triboelectric charge, measured as the charge-to-mass ratio, Q/M, as determined by the known charge blow off method, was −62 microcoulombs per gram at 20% relative humidity. As shown in Table II, there was a large effective change in the Other modifications of the present invention may occur to those skilled in the art based upon a reading of the present disclosure and these modifications are intended to be included within the scope of the present invention.

What is claimed is:

1. A process for preparing silane modified metal oxides comprising reacting a metal oxide with an amine compound with or without water present on the surface of the metal oxide to form an amine metal oxide surface intermediate optionally removing excess unreacted amine and subsequently reacting said intermediate with an organosilane wherein the organosilane is of the formula Si(X)$_n$(R$_m$)$_{4-n}$ where Si is a silicon atom, X is a leaving group selected from the group consisting of halogen and alkoxy, R is an alkyl, alkenyl, alkynyl, aryl, alkaryl, aralkyl, or the halogenated derivatives thereof;

m is an integer with a value of at least 1; and n is an integer of 1 to 3.

2. A process in accordance with claim 1 wherein the metal oxide surface contains water.

3. A process in accordance with claim 1 wherein the amine compound is selected from the group consisting of $NH_3$, methyl amine, dimethylamine, trimethylamine, methylethylamine, methylethylisobutyamine, dodecylamine, triethylamine, perfluorotriethylamine, perchlorotrimethylamine, pyridine, ethanolamine, 1,4-dimethylaminobutane, and mixtures thereof.

4. A process according to claim 1, wherein the intermediate has the formula $M_{(s)}$—O—H ... $NR^1_3$ where $M_{(s)}$ is a metal surface with a hydroxyl radical bonded thereto, $NR^1_3$ is an amine compound hydrogen bonded to the hydroxyl radical and $R^1$ is selected from the group consisting of hydrogen, alkyl, aryl, cycloalkyl, alkenyl, alkynyl, and derivatives thereof, containing from about 1 to about 25 carbon atoms.

5. A process according to claim 1, wherein the amine compound is selected from the group consisting of ammonia; mono-, di- and tri- substituted alkyl amines; mono-, di- and tri- aryl amines; and mixtures thereof.

6. A process for preparing silane modified metal oxides comprising reacting a metal oxide with an amine compound to form an amine metal oxide surface intermediate and subsequently reacting said intermediate with a halosilane wherein the metal oxide surface is free of water.

7. The process according to claim 6 wherein the amine metal oxide intermediate is reacted with the halosilane at from about 0° to 100° C. in the presence of an organic solvent for from about 1 to about 60 minutes.

8. A process according to claim 6 wherein the molar ratio of metal oxide M—OH surface groups to amine to halosilane is about 0.1:1.0:1.0 to about 1.0:1.0:5.0.

9. A process according to claim 6 wherein the halosilane is selected from the group consisting of octadecyl trichlorosilane and methyltrichlorosilane.

10. A process according to claim 6 wherein the metal oxide contains from about 5 to about 100 weight percent silica and at least one other metal oxide selected from the group consisting of $SnO_2$, $TiO_2$, $Al_2O_3$, CeO, BaO, $ZrO_2$, SrO, CaO, MgO, FeO, $Fe_3O_4$, $Fe_2O_3$, $CrO_2$, GeO, GaO, $SeO_2$, $TeO_2$, and mixtures thereof.

11. A process according to claim 6 wherein the metal oxide is silica, the amine compound is triethylamine and the halosilane is octadecyl trichlorosilane.

12. A process for preparing silane modified silica surfaces comprising reacting a silica surface with an amine compound to form an amine silanol intermediate and subsequently reacting said intermediate with a halosilane wherein the amino silanol intermediate is reacted with the halosilane at 25° C. in the presence of an organic solvent for from about 1 second to about 2 hours.

13. A process for preparing silane modified silica surfaces comprising reacting a silica surface with an amine compound to form an amine silanol intermediate and subsequently reacting said intermediate with a halosilane wherein the silica surface possesses $Si_{(s)}$—OH surface groups and surface water molecules are present and wherein the relative molar ratio of the amine compound to the silane compound is about 1:1 and the molar quantity of the amine is less than the molar quantity of the Si—OH surface groups on the silica surface thereby providing a product with both silica-silane surface groups and Si—OH surface groups.

14. A silane surface modified silica particle obtained by the process of claim 13 wherein the molar ratio of $Si_{(s)}$—OH groups to amine to chlorosilane is about 0.1:1.0:1.0 to about 1.0:1.0:5.0.

15. A process of modifying silica surfaces with halo organosilanes comprising:
(a) providing an anhydrous silica surface with $Si_{(s)}$—OH surface groups;
(b) reacting the silica surface with a first amine compound to form a first hydrogen bonded silica-amine surface intermediate;
(c) reacting the surface intermediate with a halo organosilane compound having at least two leaving groups to form a silica-silane surface compound of the formula $Si_{(s)}$—O—$SiX_{n-1}R_{4-n}$ where $Si_{(s)}$ is a surface silicon atom, X is a leaving group, R is not a leaving group, and n is an integer of 2 or 3;
(d) reacting the silica-silane surface compound with a mixture of water and a second amine to form a second hydrogen bonded silanol-amine intermediate having the formula $Si_{(s)}$—O—$SiX_{n-2}R_{4-n}$—O—H ... $NR^1_3$;
(e) sequentially repeating steps (b), (c) and (d) x number of times to form a multilayered silane compound on the silica surface of the formula $Si_{(s)}$—O—$SiX_{n-2}R_{4-n}$—(O—$SiX_{n-2}R_{4-n})_x$—O—H ... $NR^1_3$ where x is equal to from 1 to to about 15, the number of times that steps (b), (c) and (d) are collectively and sequentially repeated and $R_1$ is selected from the group consisting of hydrogen, alkyl, aryl, cycloalkyl, alkenyl, alkynyl, and derivatives thereof;
(f) optionally reacting the multilayered silane surface compound with a terminating or capping halosilane having a single leaving group or at at least one reactive site; and
(g) optionally isolating the multilayered silane modified silica surface material.

16. A process according to claim 15 wherein x is from 1 to 5 thereby providing from about 1 to 5 molecular layers of said silane on the silica surface.

* * * * *